Jan. 10, 1950

J. J. MASON 2,494,302

ARTICULATED CONVEYER

Filed Nov. 5, 1945

INVENTOR.
James J. Mason,
BY
Cromwell, Greist & Warden
Attys.

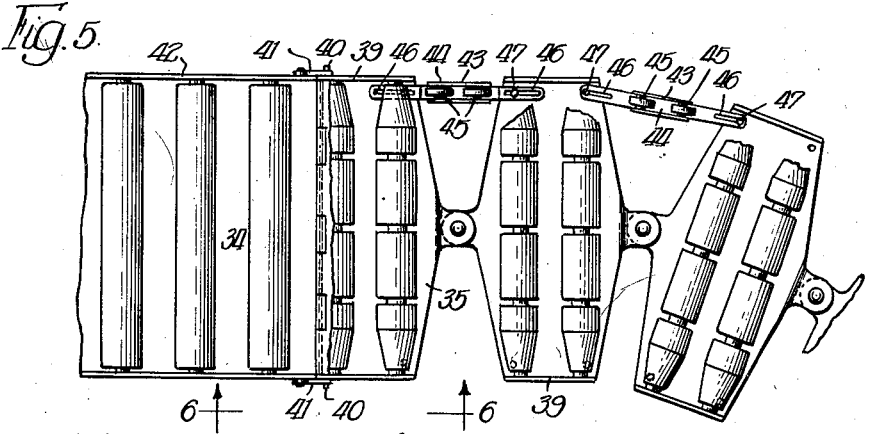
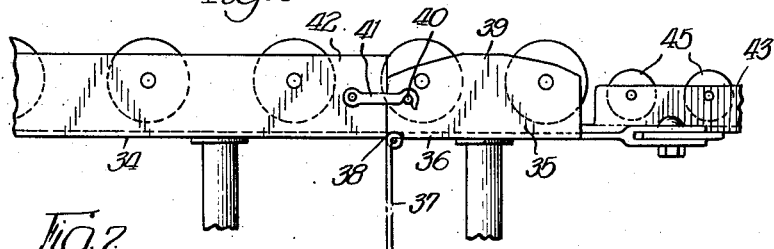
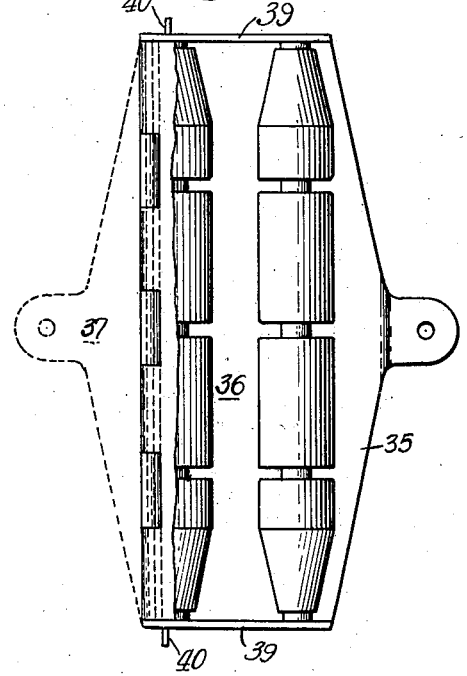
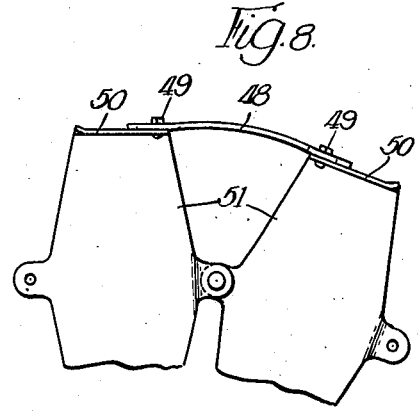
INVENTOR.
James J. Mason,
BY
Cromwell, Greist & Worden
Attys.

Patented Jan. 10, 1950

2,494,302

UNITED STATES PATENT OFFICE 2,494,302

ARTICULATED CONVEYER

James J. Mason, Chicago, Ill.

Application November 5, 1945, Serial No. 626,754

12 Claims. (Cl. 193—35)

1

My invention is concerned with improvements in conveyors.

In the handling of material, such as articles, containers, or packages, in factories, warehouses, loading depots, and similar places, by means of conveyors, it is frequently desirable to have available one or more conveyor sections which may be inserted in a conveyor line where it is desired to change the direction of the movement of the material. It is an object of my invention to provide a conveyor construction which may be used for this purpose.

It is an object of my invention to provide an articulated conveyor comprising separable conveyor units or sections which may be arranged in connected relation so that the movement of the material traveling on the conveyor may be in a straight or curved path as desired.

It is an object of my invention to provide articulated conveyor sections which are simple in construction, readily installed in a standard conveyor line, and so constructed that they may be connected in either a straight or a curved line as desired.

It is an object of my invention to provide a conveyor section or unit which is adapted to be connected either to a standard straight line conveyor section or to other conveyor units of a similar nature.

It is an object of my invention to provide articulated conveyor sections or units which may be joined to each other in either a curved or a straight line and one or more such sections provided with means for rigidly connecting the same to a standard straight line conveyor section.

These and other objects of my invention will be apparent from the preferred form of my invention and the several modifications thereof which are illustrated by way of example in the accompanying drawings, wherein:

Fig. 5 is a plan of a conveyor construction illustrating one unit modified to adapt it for connection with a standard straight line conveyor section and other articulated units provided with modified side bracing or connecting links;

Fig. 6 is an elevation on the line 6—6 of Fig. 5;

Fig. 7 is a plan of the standard conveyor connecting unit of Fig. 5, to an enlarged scale; and

2

Figure 1:
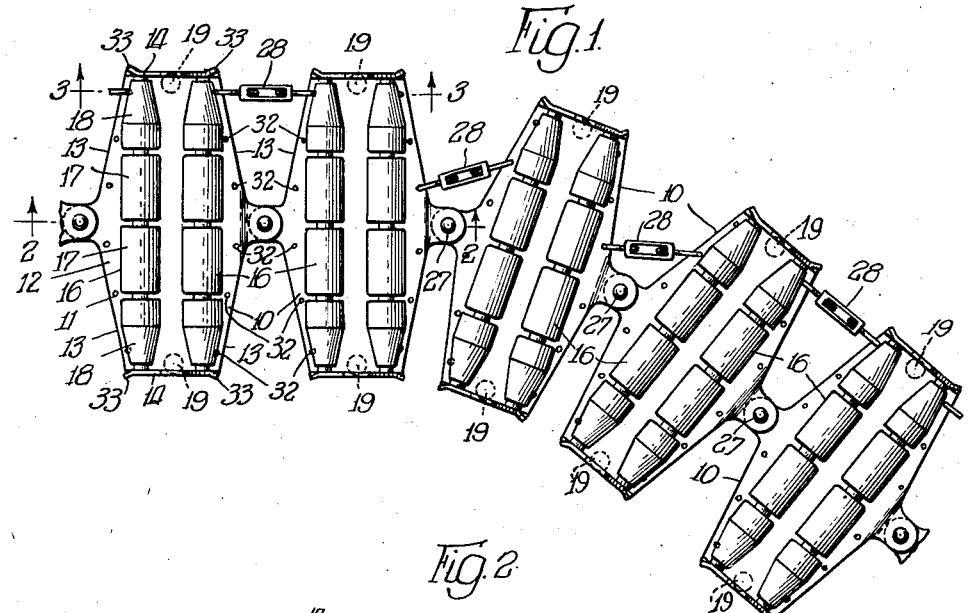
Fig. 1 is a plan of a plurality of my conveyor units connected to each other illustrating both straight line and curved line arrangements.
Figure 2:
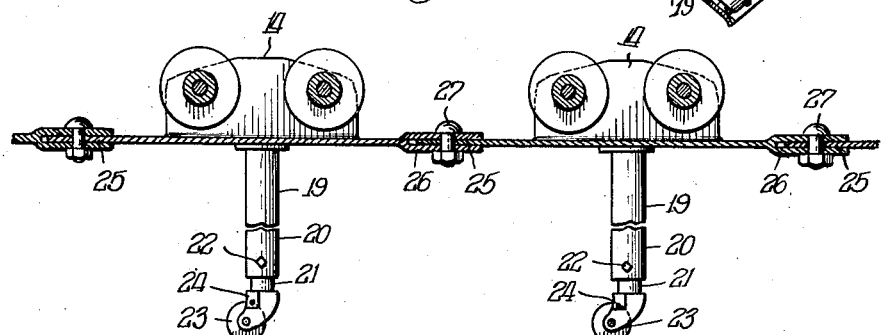
Fig. 2 is a section on line 2—2 of Fig. 1.
Figure 3:
Fig. 3 is a section on line 3—3 of Fig. 1.
Figure 4:
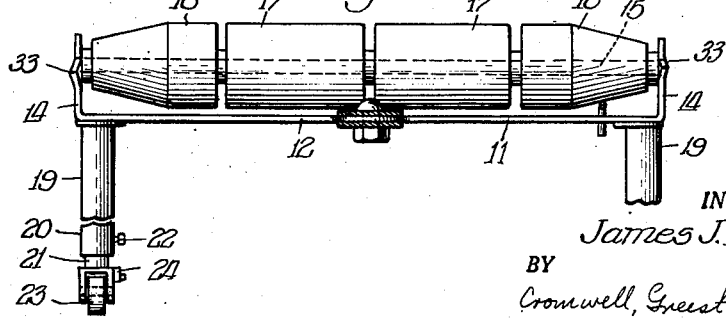
Fig. 4 is an elevation of one of my units with parts broken away.

Fig. 8 is a fragmentary plan showing a modified form of end embracing means.

The form of my invention as illustrated in Figs. 1 to 4 comprises a conveyor section or unit 10 which, as illustrated, is designed to be connected in articulated relation to like sections, or units, to form an articulated conveyor of any desired length, and arranged on either a curved line, or a straight line, as desired.

The conveyor section 10 comprises a frame construction 11, which may be of solid plate material, as illustrated, or angle iron, pipe, or the like, having a base 12 of the general configuration illustrated with the greatest length along the transverse center line and tapering inwardly at 13 toward each side where it terminates in an upstanding plate 14. Supported on parallel shafts 15, which are mounted between the plates 14 of each unit 10, are two sectional rollers 16 each comprising center roller sections 17 and side roller sections 18 having an outward taper. Each conveyor unit 10 is supported by a pair of legs 19 which comprise adjustable telescoping sections 20 and 21 held in adjusted relation by set screw 22, the lower section 21 being provided with a conventional roller caster 23 having locking means 24.

The base 12 of each unit 10 is provided with a male connecting member 25 and a female connecting member 26 for connecting the units in articulated relation by means of a pin 27, or the like. An adjustable end bracing member 28 is provided which consists of a turnbuckle 29 and oppositely threaded rods 30, each of which has a downwardly directed end 31, adapted to be received in holes 32 spaced along the tapered edges 13. The brace 28 is adjustable in length and may be arranged in any desired pair of the holes 32 to properly brace the connected units. The top outer corners of end plates 14 are curved outwardly slightly at 33 to prevent articles or packages being moved over the rollers 16 from being caught or hung up on the corners of the side plates and to direct the articles back toward the center of the unit.

As illustrated in Fig. 1 the units 10 are designed to be connected in articulated relation and arranged in either a straight line, or a curved line, as desired. The braces 28 hold the adjacent units in the desired relation. The units are adjusted to the desired height by means of the telescoping legs 19 and when in proper position the caster rollers 23 are locked to prevent their movement. The packages or articles move over the conveyor sections by gravity or they are pushed by hand or moved along by movement of succeeding articles. The individually adjustable legs permit the sections to be banked or tilted around the curves to facilitate movement of the articles and to aid in retaining them on the rollers as they move over the same and around the curved sections.

While a plurality of my conveyor sections may be connected to form any length conveyor, they are particularly useful in providing curved lengths of conveyor between sections of a conventional or standard straight line conveyor arrangement as illustrated in Fig. 5. In order to connect one or more of my articulated units with a section 34 of a standard straight line conveyor, I provide a modified unit 35 which is constructed in the same manner as the units 10, except for the base 36 of the frame which is provided with a hinged section 37 adapted to be swung down out of the way (Fig. 6), so that the unit 35 may be abutted against the edge 38 of the standard section 34. The side plates 39 are provided with means for connecting the unit to the standard section 34 which may be pins 40 engaged by hooks 41 on the side plates 42 of the standard section 34. The construction of the unit 35 may be otherwise the same as unit 10 of Figs. 1 to 4.

As shown in Fig. 5 my conveyor units may be provided with a modified form of side brace member 43 which comprises a base member 44 having centrally journaled skate rollers 45 and provided at each end with slots 46. Fastening bolts 47, provided with wing nuts, and mounted near the sides of the units are received in the slots 46 to adjustably connect the brace members 43 with the units. The skate rollers 45 tend to urge packages or articles which move onto them back towards the center of the units as they move around the turns.

In Fig. 8 a further modification of a side bracing means is illustrated. It comprises a flat spring metal strap 48 which is slotted at each end to receive a fastening stud 49 secured in the side plates 50 of the units 51. The strap 48 will function as a brace means and also retain the goods on the conveyor as it moves around the outside of the curved sections.

While I have described specific details of materials and construction, I contemplate the use of other appropriate materials and details of construction within the scope of my invention.

I claim:

1. A conveyor comprising a plurality of pivotally connected conveyor sections, each of said sections having a frame provided with forwardly and rearwardly extending male and female connecting members along the center line, said sections having tapered edges extending from the center line toward the sides of the same, and individually adjustable brace means, said brace means being connected at opposite ends to adjacent sections along one side whereby the sections may be arranged in rigidly connected relation to provide said conveyor with either a straight or a curved path.

2. A conveyor comprising separable conveyor sections adapted to be connected together to form an articulated conveyor structure, said separable sections having centrally arranged forwardly and rearwardly extending pivotal connecting means whereby they may be arranged on either a straight or curved line, individually adjustable brace means connected to aligned sections adjacent the sides thereof, and adjustable supporting means on each section to permit tilting of the individual conveyor sections.

3. In a conveyor having articulated sections, brace means for connecting the adjacent sections comprising a brace bar, skate rollers journaled thereon, and means for adjustably connecting said bar at each end to a conveyor section at selected points between the articulated connection of the section and a lateral side thereof.

4. In a conveyor, separable conveyor units, means for pivotally connecting the units in articulated relation, one or more of said units being provided with a hinged portion carrying said pivotal connecting means and separate means on said unit for rigidly connecting said unit to the end of a standard conveyor section, whereby said units may be interconnected in a standard conveyor line to provide a curved conveyor portion.

5. A conveyor section for connecting articulated conveyor sections with a standard straight line conveyor section comprising a frame, spaced rollers mounted on said frame, extensions forwardly and rearwardly on said frame adjacent the center line of the same, connecting means on said extensions whereby said section may be connected in articulated relation with other similar sections, one of said extensions being retractable on said frame whereby when said extension is retracted to a predetermined position said section may be abutted against the end of a standard straight line conveyor section, and separate means on said section for rigidly and releasably connecting the same to said standard section when in abutting relation therewith.

6. A conveyor comprising a plurality of pivotally connected conveyor sections, each of said sections having a frame provided with forwardly and rearwardly extending male and female connecting members along the center line, a pair of spaced rollers extending transversely of each of said sections, said sections being so constructed that they are spaced a substantial distance from each other laterally of said connecting members, adjustable brace means connecting said sections along one side, and means on said brace means cooperating with the rollers on said sections for supporting articles conveyed thereon whereby the sections may be arranged to provide said conveyor with either a straight or a curved path.

7. In a conveyor having articulated sections, brace means for connecting adjacent sections near the sides thereof, said brace means comprising a base member, a roller journaled on said base member and adjustable means for connecting the ends of said base member to the conveyor sections.

8. In a conveyor having articulated sections, rollers journaled on each of said sections, pivotal means connecting said sections in articulated relation, brace means spaced laterally of said pivotal connecting means, adjustable means for connecting the ends of said brace means to said sections whereby said sections may be braced and held in either straight or curved relation and a roller on said brace means cooperating with the rollers of said sections to support and guide the articles being transported on said conveyor.

9. In an articulated conveyor having separable conveyor sections, means for pivotally connecting said sections whereby said sections may be arranged in a straight or curved path, brace means for connecting adjacent sections comprising individual brace bars of spring material and means for adjustably connecting the ends of said brace bars to the adjacent conveyor sections to hold said sections in rigid relation to each other in the desired path.

10. In an articulated conveyor having separable conveyor sections, means for pivotally connecting said sections whereby said sections may be arranged in a straight or curved path, brace means laterally spaced from the pivotal connecting means for connecting said sections, and means for adjustably securing the ends of said brace means to adjacent conveyor sections to hold said sections in said path in rigid relation to each other.

11. A conveyor comprising a plurality of pivotally connected conveyor sections, each of said sections having a frame provided with forwardly and rearwardly extending male and female connecting members along the center line, a pair of spaced rollers extending transversely of each of said sections, said sections being spaced a substantial distance from each other laterally of said connecting members, adjustable brace means connecting said sections along one side and a roller mounted on said brace means between said sections whereby the sections may be arranged to provide said conveyor with either a straight or a curved path and whereby said roller on said brace means cooperates with the rollers on said sections to support and guide articles conveyed thereon.

12. A conveyor comprising separable conveyor sections adapted to be connected together to form an articulated conveyor structure, said separable sections having centrally arranged forward and rearward pivotal connecting means whereby they may be arranged on either a straight or a curved line, brace means for connecting the aligned sections adjacent the sides thereof, a pair of rollers on each section, a cooperating guide roller on each brace means, and adjustable supporting means on each section to permit tilting of the individual conveyor sections.

JAMES J. MASON.

REFERENCES CITED

The following references are of record in the file of this patent:

UNITED STATES PATENTS

| Number | Name | Date |
| --- | --- | --- |
| 824,943 | Mathews | July 3, 1906 |
| 993,737 | Thurman | May 30, 1911 |
| 1,149,647 | Harwood | Aug. 10, 1915 |
| 1,487,634 | Waters | Mar. 18, 1924 |
| 1,809,251 | Pflimlin | June 9, 1931 |
| 1,906,288 | Twomley | May 2, 1933 |
| 1,935,734 | Twomley | Nov. 21, 1933 |
| 2,172,381 | Harris | Sept. 12, 1939 |
| 2,262,443 | Anderson | Nov. 11, 1941 |
| 2,307,389 | Carter | Jan. 5, 1943 |
| 2,346,659 | Bruce | Apr. 18, 1944 |
| 2,384,959 | Pearson | Sept. 18, 1945 |

FOREIGN PATENTS

| Number | Country | Date |
| --- | --- | --- |
| 550,601 | France | Mar. 14, 1923 |